(12) United States Patent
Rietzler

(10) Patent No.: US 9,977,932 B2
(45) Date of Patent: *May 22, 2018

(54) METHOD AND ARRANGEMENT FOR PROVIDING AND MANAGING INFORMATION LINKED TO RFID DATA STORAGE MEDIA IN A NETWORK

(71) Applicant: SMARTRAC Investment B.V., Amsterdam (NL)

(72) Inventor: Manfred Rietzler, Marktoberdorf (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/405,360

(22) Filed: Jan. 13, 2017

(65) Prior Publication Data

US 2017/0124363 A1 May 4, 2017

Related U.S. Application Data

(63) Continuation of application No. 14/122,894, filed as application No. PCT/EP2012/001765 on Apr. 25, 2012, now Pat. No. 9,582,690.

(30) Foreign Application Priority Data

May 31, 2011 (DE) .................. 10 2011 103 740

(51) Int. Cl.
*G06K 7/10* (2006.01)
*G06Q 10/08* (2012.01)
*G06Q 50/28* (2012.01)

(52) U.S. Cl.
CPC ..... *G06K 7/10297* (2013.01); *G06K 7/10009* (2013.01); *G06K 7/10386* (2013.01); *G06Q 10/08* (2013.01); *G06Q 50/28* (2013.01)

(58) Field of Classification Search
CPC .......... G06K 7/10009; G06K 7/10297; G06K 7/10386; C06Q 10/08; G06Q 50/28
See application file for complete search history.

(56) References Cited

U.S. PATENT DOCUMENTS 7,493,082 B2 * 2/2009 Perttila ............... H04M 1/7253
340/10.1
8,072,331 B2 * 12/2011 Narendra ........... G06K 19/0701
235/380
8,306,512 B2 * 11/2012 Dixon .................... G06Q 10/08
455/406

(Continued)

*Primary Examiner* — Brian Miller
(74) *Attorney, Agent, or Firm* — Tue Nguyen

(57) ABSTRACT

A method provides and manages information linked to RFID data storage media in a network with data transmission between an RFID data storage medium and an RFID reading unit, integrated in a mobile radio device, for reading the data stored on the RFID data storage medium. A data link is set up to a network server in a network via a radio interface of the mobile radio device. A data memory area on the network server is associated with the RFID data storage medium. An arrangement provides and manages information linked to RFID data storage media in a network. The arrangement includes an RFID data storage medium, a mobile radio device with an integrated RFID reading unit for reading RFID data records, and a network with a network server. The network server has a data memory area which is associated with the RFID data storage medium.

25 Claims, 2 Drawing Sheets

(56) References Cited

U.S. PATENT DOCUMENTS

| | | | | |
|---|---|---|---|---|
| 8,320,570 | B2* | 11/2012 | Kang | G06K 7/0008 340/10.51 |
| 8,395,488 | B2* | 3/2013 | Gallo | G06Q 20/04 235/492 |
| 8,605,816 | B2* | 12/2013 | Tsushima | H04L 27/06 235/451 |
| 8,874,036 | B2* | 10/2014 | Sakai | G06Q 10/00 340/10.1 |
| 8,909,218 | B2* | 12/2014 | Smith | H04W 4/06 340/10.51 |
| 8,981,935 | B2* | 3/2015 | Falk | G06Q 10/08 340/10.4 |
| 8,988,223 | B2* | 3/2015 | Puleston | H04L 67/04 340/10.1 |
| 2006/0027655 | A1* | 2/2006 | Smets | G01R 31/302 235/451 |
| 2007/0145135 | A1* | 6/2007 | Jogand-Coulomb | G06K 7/10237 235/451 |
| 2008/0024268 | A1* | 1/2008 | Wong | G06F 21/72 340/5.8 |
| 2008/0208753 | A1* | 8/2008 | Lee | G06Q 20/045 705/51 |
| 2009/0152361 | A1* | 6/2009 | Narendra | G06Q 20/32 235/492 |
| 2009/0265552 | A1* | 10/2009 | Moshir | H04L 63/0464 713/168 |
| 2010/0198675 | A1* | 8/2010 | Mockli | G06F 17/30047 705/14.26 |
| 2010/0207742 | A1* | 8/2010 | Buhot | H04B 5/06 340/10.51 |
| 2011/0087887 | A1* | 4/2011 | Luft | H04L 9/3247 713/178 |
| 2012/0174001 | A1* | 7/2012 | Friedman | G06F 3/048 715/763 |
| 2013/0285798 | A1* | 10/2013 | Koike | G06K 17/0025 340/10.51 |
| 2013/0299569 | A1* | 11/2013 | Gentile | G06Q 10/0833 235/375 |
| 2015/0032569 | A1* | 1/2015 | Stromberg | G06K 7/10009 705/26.35 |

* cited by examiner

METHOD AND ARRANGEMENT FOR PROVIDING AND MANAGING INFORMATION LINKED TO RFID DATA STORAGE MEDIA IN A NETWORK

CROSS REFERENCE TO RELATED APPLICATIONS

This application is a continuation of and claims priority from U.S. patent application Ser. No. 14/122,894 titled 'METHOD AND ARRANGEMENT FOR PROVIDING AND MANAGING INFORMATION LINKED TO RFID DATA STORAGE MEDIA IN A NETWORK' filed on Nov. 27, 2013; which is a United States National Phase Application of International Application PCT/EP2012/001765 filed Apr. 25, 2012 and claims the benefit of priority under 35 U.S.C. § 119 of German Patent Application DE 10 2011 103 740.7 filed May 31, 2011, the entire contents of which are incorporated herein by reference.

FIELD OF THE INVENTION

The invention relates to a method for providing and managing information linked to RFID data storage media in a network, wherein the method comprises data transmission between an RFID data storage medium and an RFID reading unit, integrated in a mobile radio device, for reading the data stored on the RFID data storage medium, and also setup of a data link to a network server in a network via a radio interface of the mobile radio device.

In addition, the invention relates to an arrangement for providing and managing information linked to RFID data storage media in a network, having an RFID data storage medium, a mobile radio device with an integrated RFID reading unit for reading RFID data records, and having a network with a network server.

BACKGROUND OF THE INVENTION

Transmission systems, which provide a wireless transmission path between two devices that are brought close together (short-range communication) and which enable data transfer with a global network via a mobile radio connection, have already become standard to a large extent. In the field of short-range communication, the data interface that is specified according to a procedure called NFC (Near Field Communication) is the most important one to be mentioned here (ISO/IEC 18092, ISO/IEC 21481). The technical basis of the NFC transmission system is constituted by an NFC data storage medium (NFC tag), which consists of a microchip with a data memory carrying information and of a coupling element and which, when advancing an NFC reading device, starts to interact with the electromagnetic field emitted by the same in such a way that the information stored on the NFC tag can be read out and processed. In this system configuration, the NFC tag is configured as a purely passive assembly, which obtains its energy from the alternating electromagnetic field of the reading device that initiates the transmission. Here, the connection setup and the data transmission proceed without any further manual configuration of the communicating devices.

This property makes the NFC technology interesting for contactless card systems, for instance in connection with contactless smartcards for access control or electronic payment systems.

For users of this technology, the automatic activation of the data transmission proves to be particularly convenient since no other actions beyond advancing the NFC tag are required.

New application fields arise due to the fact that the NFC functionality is integrated into mobile radio devices, in order to enable users, simply by advancing an NFC-enabled cell phone towards a passive NFC data storage medium, to make use of services that are provided by a global network to which the cell phone is connected via its radio interface. Combining the NFC technology with processes of mobile radio transmissions extends the range of capabilities of contactless card systems by making it possible that the data provided by an NFC tag can now be used via the mobile radio network in a comprehensive global network. With respect to future generations of mobile radio devices, it can thus be expected that many cell phones will be equipped with an NFC data interface. Therefore, the mobile radio device of the future will be capable both of emulating a passive NFC tag that is configured as a contactless smartcard (NFC Card Emulation Mode), and of reading and writing on an NFC tag (NFC Reader/Writer Mode) as well as of exchanging information with peer devices (NFC Peer-to-Peer Mode).

The applications are primarily directed towards consumers, i.e. individuals, for whom their cell phones represent a permanent means of communication and for whom it is made possible, by combining NFC technology and mobile communications, to make use of a broader range of NFC services with an "all-in-one" device.

Furthermore, the NFC interface is also specified such that it is compatible with the RFID—(Radio Frequency Identification) transmission standards ISO 14443 and ISO 15693. Thus, an NFC-enabled device for reading RFID data storage media (RFID tags, RFID transponders) can be used. Usually, RFID tags are connected to an object in a permanent manner, such that the same can be clearly identified by reading out the data that it possesses and that are stored in the RFID tag. Such a labeling accompanying the goods increasingly replaces attaching and scanning barcodes for identifying goods in the fields of goods transportation and goods logistics. In addition, RFID tags are also utilized in production operations for tracking components, for instance in car body manufacturing operations in the automotive industry. Up to now, only companies use RFID data storage media, such that individuals as consumers have virtually no chance to obtain further information "online" on the object that is provided with an RFID data storage medium.

SUMMARY OF THE INVENTION

Thus, the present invention is based on an object to provide, based on the data stored on an RFID data storage medium, additional object information for consumers and to make it possible for persons in possession of the RFID data storage medium to update said further information at any time.

According to the invention, a method provides and manages information linked to RFID data storage media in a network. The method includes providing a data transmission between an RFID data storage medium and an RFID reading unit, integrated in a mobile radio device, for reading the data stored on the RFID data storage medium. A data link is setup to a network server in a network via a radio interface of the mobile radio device. A data memory area on the network server is associated with the RFID data storage medium.

The fundamental idea of the present invention is based on incorporating RFID data storage media into a higher-level network. In this network, which, as explained further below, can advantageously be the Internet, on a network server a data memory area, on which additional object information on the object that is connected to the RFID data storage medium is stored, is associated with the RFID data storage medium.

For the consumer to be able to access said information, i.e. to be able to retrieve the object-related information from the network server, the RFID data storage medium has to be clearly identifiable within the global network and, from the data that are stored on the RFID data storage medium, access data for the server data memory area have to be generated and transferred into the comprehensive network, said access data subsequently allowing to retrieve the additional object information.

In an advantageous manner, identifying and reading the data that are stored on the RFID data storage medium is effected in a contactless way by means of data transmission between an RFID data storage medium and an RFID reading unit that is integrated in the mobile radio device. Due to the fact that the mobile radio device includes an integrated RFID interface, and that it has become normal to carry along a mobile radio device, it has to be assumed that consumers, in a simple manner, will be able to identify a labeled RFID data storage medium and the object linked thereto, respectively, as well as to read out the stored data by advancing their cell phones to the data storage medium or by touching the data storage medium briefly. Via the radio interface of the mobile radio device, on the basis of the information that has been read out and processed as access data, the setup of a data link to the network server in the (global) network is subsequently effected.

By linking short-range communication (RFID technology) and mobile radio transmission, whereupon the method is based, as a network access in connection with a server data memory area that is associated with the RFID data storage medium, it is thus possible to provide additional object information to consumers. In addition, the method offers persons in possession of the RFID data storage medium the opportunity to update said additional information at any time.

In another advantageous embodiment, the association of the server data memory area with the RFID data storage medium is effected by addressing the server data memory area by means of an RFID data record that is stored on the RFID data storage medium. The server data memory area that can be addressed via the (Internet) network thus receives its address from the data that are stored on the RFID data storage medium.

Preferably, the association of the RFID data storage medium with the RFID data record for addressing the server data memory area is effected by means of a serial number of the RFID data storage medium or by means of an identifier that is stored on the RFID data storage medium. It is also possible that the association of the RFID data storage medium with the RFID data record for addressing the server data memory area is effected by means of a combination of a serial number of the RFID data storage medium and of an identifier that is stored on the RFID data storage medium.

In order to prevent that the data stored on the RFID data storage medium can be misused by unauthorized persons, the data contained in the RFID data record for addressing the server data memory area are stored in an encrypted way.

It proves to be advantageous if the data transmission between the RFID data storage medium and the RFID reading unit is effected by means of an NFC interface, which is integrated into the mobile radio device and which is compatible with an RFID interface (8). As part of introducing NFC-enabled mobile radio devices in connection with the RFID compatibility of the NFC interface, it can be expected for the future that every person in possession of a cell phone that is NFC-enabled will also carry along an RFID reading device at the same time. As a result, an infrastructure is available which also makes it possible for consumers to retrieve additional object information "online" by means of a data link to a network server in a network via the radio interface of their mobile radio devices.

A particular advantage consists in that the data transmission between the RFID data storage medium and the RFID reading unit as well as the setup of the data link to the network server via the radio interface are controlled by means of an application software that is installed on the mobile radio device. In the form of a small application program ("applet") to be executed on the mobile radio device, said software can be made available to consumers and to persons in possession of the RFID data storage medium along with providing the server data memory area.

It is advantageous if, after starting the application software, the RFID reading unit reads out the RFID data record from the RFID data storage medium, generates an access right for the server data memory area from these data, directs a request to the network server and processes the data received from the network server such that they can be presented on the mobile radio device. The starting command of the user thus causes the application software to perform the entire process of the data transmission and to accompany the corresponding actions in an interactive manner.

Preferably, the setup of the data link to the network server is effected within a global network, preferably on the Internet. Although a data link to a network server could also be set up in a local or private network, incorporating the RFID data storage medium into the Internet offers consumers much greater opportunities for obtaining information due to it being a worldwide network. Conversely, the additional object information that is stored on the data memory area of an Internet server reaches a very large target group.

In order to make it possible to access the server data memory area from any location, the setup of the data link to the network server is effected via the radio interface that is specified in accordance with a mobile radio standard. Due to the high network coverage of the mobile radio networks, the same are suitable as access networks to the comprehensive global network. Via a radio interface that is specified according to a mobile radio standard, consumers gain access to the additional object information from almost everywhere that means from all those places where an object with an RFID data storage medium is located.

In addition, it is also advantageous if the setup of the data link to the network server is effected via the radio interface that is specified in accordance with a local radio network standard. If no mobile radio network is available, access to a higher-level global network can be established, for instance, via a WLAN connection.

Advantageously, the server data memory area is provided with an access authorization for different user categories with specific access rights. As a result, it becomes possible to set the access authorization and the type of access depending on the user.

Thus, it proves to be advantageous if members of a first user category possess the full access authorization including the write and read authorization and directly have access to the server data memory area by means of a password.

Persons in possession of the RFID data storage medium could belong to said first user category, for whom it is thus possible to create and modify the data that are stored in the server data memory area themselves. As a security measure against use by unauthorized persons, protection by means of a password is envisaged here.

Members of a second user category could only possess the read authorization and, in the case of the Internet network, could only indirectly have access to the server data memory area via an Internet portal. For this user category, the indirect access to the database is effected by means of an access key which is generated when reading the RFID data storage medium. Furthermore, several other user categories can be established in order to make access to specific object information available only to a selected user group.

The server data memory area can also comprise data which present a link to other databases or websites. In this way, it is possible for users to have access to still further Internet-based information which relates to the object provided with the RFID data storage medium.

In another advantageous embodiment, on the RFID data storage medium further reference data for the server data memory area can be stored, which reference data are read out manually in an off-line mode and can either be used directly or serve for the manual setup of a network link. If the data link to the network server fails, the method can thus work with a limited scope of function.

The application software can also be a basic reading software, with which further reference data that are stored on the RFID data storage medium can be read out in order to be able to directly download extended application software modules onto the mobile radio device from the network. Thus, alternatively to providing an entire application software, it is possible to offer a software environment in which users compile the desired application software modules themselves. With the basic reading software, the reference data are read from the RFID data storage medium and, corresponding to the references contained in the reference data, the desired application software modules can be downloaded onto the mobile radio device and can be executed correspondingly.

In order to guarantee security and to prevent misuse of the data, the data transmission between the mobile radio device and the network server can be effected in an encrypted manner, wherein a key for an encryption algorithm is stored on the RFID data storage medium.

In another advantageous embodiment, by means of an additional signal input for determining an external condition, the RFID data record for addressing the server data memory area can be stored in a pre-set memory area in a targeted manner, corresponding to the state of the signal input. Depending on the state of the additional signal input, it can thus be set in which memory area on the RFID data storage medium the RFID data record is to be stored, wherein said memory area can be a subordinate area or a parallel area of the memory area on the RFID data storage medium.

With respect to an arrangement, the object is attained, according to the invention, in connection with the preamble of claim 19 in that the network server has a data memory area which is associated with the RFID data storage medium.

The arrangement comprises an RFID data storage medium, a mobile radio device with an integrated RFID reading unit for reading RFID data records and a network with a network server. Said arrangement advantageously enables incorporating RFID data storage media into a higher-level network, such that it is possible for users of a mobile radio device that is equipped with an RFID reading device to retrieve additional object information that is linked to the RFID data storage medium from a server that is located within the network. For this purpose, the network server has, according to the invention, a data memory area which is associated with the RFID data storage medium.

In order to make it possible to access the server data memory area, the RFID data storage medium has a memory area for receiving an RFID data record, which creates the association of the server data memory area with the RFID data storage medium by addressing the server data memory area. This means that the server data memory area can be addressed via the RFID data record which is stored on the RFID data storage medium.

In another advantageous embodiment, the mobile radio device comprises an NFC interface which is compatible with an RFID interface (8). Due to the increasing number of NFC-enabled mobile radio devices which are capable of emulating an RFID interface, it is made possible for users of cell phones to access further information that is stored outside of the RFID data storage medium via the (mobile) radio network.

Advantageously, the network is a global network, preferably the Internet. By incorporating the RFID data storage medium into the Internet, the object-related additional information that is linked to the RFID data storage medium is available from almost every location at which an RFID data storage medium is present.

Advantageously, the RFID data storage medium has a memory area for receiving further access data and reference data. In this way, besides the RFID data record for addressing the server data memory area, further data can be stored directly on the RFID data storage medium, which, in the case of a transmission fault on the radio path into the (global) network, serve to make possible limited working in an off-line mode.

Another advantageous embodiment of the arrangement envisages the RFID data storage medium to have an additional signal input for determining an external condition with which the RFID data record for addressing the server data memory area can be stored in a pre-set memory area in a targeted manner, corresponding to the state of the signal input. Said signal input can be a sensor or a switch, which, by its state, sets in which memory area the association data are stored in the RFID data storage medium.

Other advantageous design features of the method and of the arrangement result from the following description and from the drawings, which illustrate a preferred embodiment of the invention in an exemplary manner. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
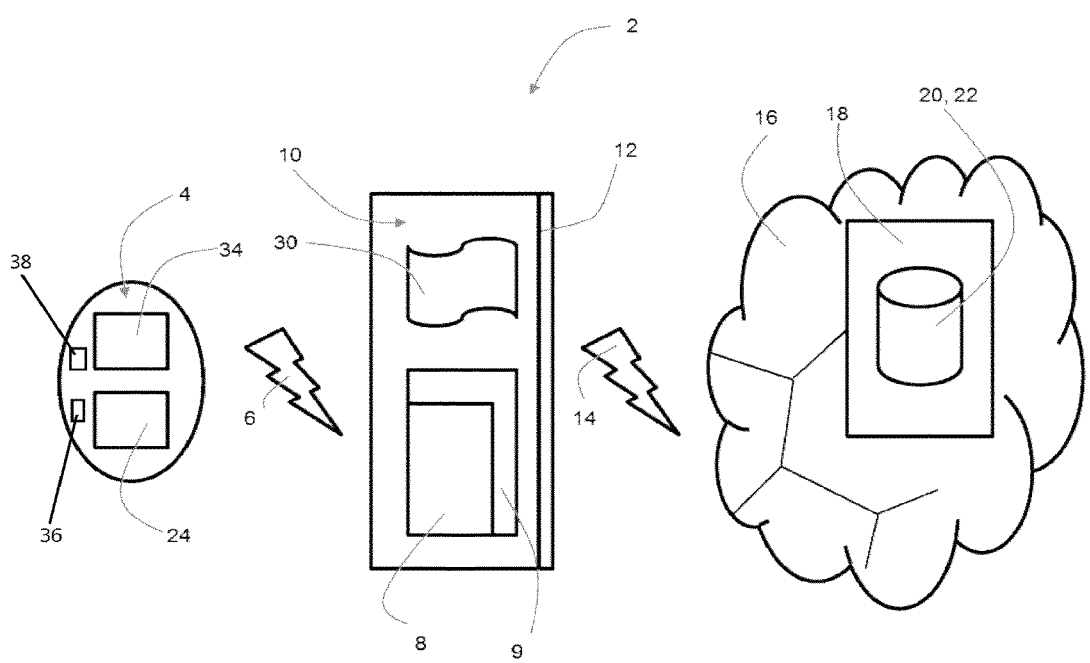
FIG. 1 is a schematic illustration of the arrangement according to the invention.

Referring to the drawings in particular, determining the structure of the method according to the invention. An RFID data storage medium 4 is illustrated, which is coupled to an RFID reading unit 8 via a contactless (Near Field) data transmission 6. The RFID data storage medium includes a serial number 36 and an additional signal input 38. The RFID reading unit 8 is integrated into a mobile radio device 10 which sets up a data link 14 to the network 16 (Internet) via its radio interface 12. The RFID reading unit 8 includes an NFC interface 9. Within the network 16, a network server 18 is installed, which, configured as a database server, stores additional object information 22, which is linked to the RFID data storage medium 4, in a server data memory area 20. The linking is effected by addressing the server data memory area 20 by means of an RFID data record 24 which is stored on the RFID data storage medium 4.

Figure 2:
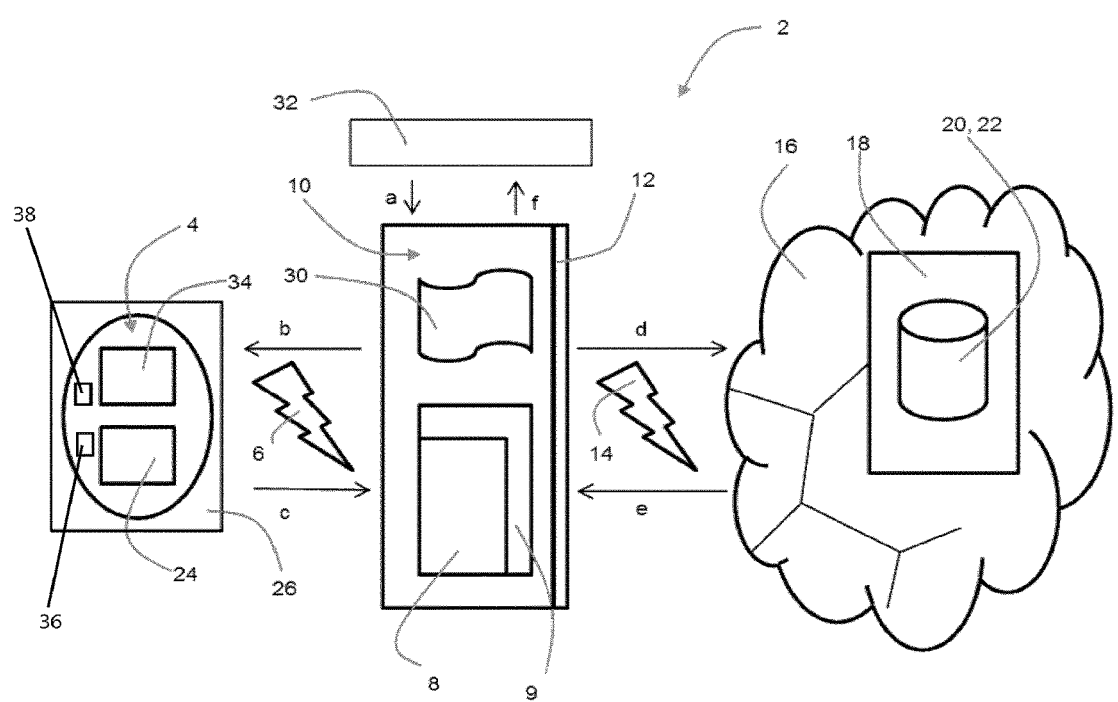
FIG. 2 is a schematic illustration according to FIG. 1 with a message sequence.

In FIG. 2, the schematic illustration according to FIG. 1 can be seen, supplemented by a message sequence a to f, with which the additional object information 22 on an object 26 is provided. The additional information 22 can, for instance, consist of details regarding the production data or the expiry date of a product, regarding the production site or can consist of other product-related data or can comprise general producer details. Thus, the method can also be used as an authenticity labeling of goods, in that the consumer 32 installs an application software 30 on his mobile radio device 10, which assumes control of the message sequence a to f, as explained in the following.

After the application software 30 has been started a by the user 32, initially, a request b is directed to the RFID data storage medium 4. If the review of the RFID data storage medium 4 has a positive result, the same responds with the release c of the data that are stored on the RFID data record 24. After the data have been read out c, the application software 30 generates an access right for the server data memory area 20 from these data and directs a request d to the network server 18, in order to retrieve e the additional object information 22. Subsequently, the information 22 that is received is correspondingly analyzed, processed and presented to the user 32 by the application software 30.

Alternatively to installing an entire application software 30, it is also conceivable that the user 32 initially only installs a software environment or a basic software, in which he subsequently inserts specific software modules 30 compiled by himself, for instance for the purpose of authenticity labeling, by downloading the same from the network server 18. For this purpose, the link to the corresponding downloads could be indicated by reference data on the RFID data storage medium 4. For receiving said reference data, the RFID data storage medium 4 can have a further memory area 34.

While specific embodiments of the invention have been shown and described in detail to illustrate the application of the principles of the invention, it will be understood that the invention may be embodied otherwise without departing from such principles.

What is claimed is:

1. A method comprising at least the steps of:
   providing a mobile device comprising at least an RFID reading unit;
   providing a network server comprising a server data memory area, said server data memory area comprising first data;
   providing an RFID element comprising an RFID data storage medium, said RFID data storage medium comprising an RFID data record, said RFID data record comprising second data, wherein the second data comprises information to form a data link to the network server;
   transmitting, by said RFID element, or receiving, by said RFID reading unit, said RFID data record from said RFID element to said RFID reading unit, said RFID reading unit generating network server access data based on the information to form the data link to the network server on said RFID data record;
   transmitting, by said network server, or receiving, by said mobile device, said first data from said server data memory area to said mobile device.

2. The method according to claim 1 wherein the RFID reading unit is integrated in the mobile device to allow the mobile device to access data stored on the RFID storage medium.

3. The method according to claim 1, wherein the second data comprises an address of the server data memory area.

4. The method according to claim 1, wherein the second data comprises one or more identifiers stored on the RFID data storage medium.

5. The method according to claim 1, wherein the server data memory area comprises an access authorization for different user categories with specific access rights, wherein the access authorization provides access levels to the server data memory area by means of the RFID data record.

6. The method according to claim 5, wherein the access authorization comprises a password.

7. The method according to claim 5, wherein members of one user categories possess full access authorization including write and read authorization and have access to the server data memory area by the access authorization.

8. The method according to claim 5, wherein members of one user categories possess only read authorization and indirectly have access to the server data memory area.

9. The method as in claim 1 further comprising
   setting up the data link between the mobile device and the network server, after the RFID reading unit generates the network server access data.

10. The method as in claim 9, wherein the data link is between the network server in a network via a radio interface of the mobile radio device.

11. The method as in claim 1 further comprising
    setting up a data link between the RFID reading unit and the RFID data storage medium, wherein the data link between the RFID data storage medium and the RFID reading unit is effected by means of an NFC system which is integrated into the mobile radio device.

12. The method as in claim 1 further comprising
    setting up a first data link between the RFID reading unit and the RFID data storage medium, and
    setting up a second data link between the mobile device and the network server, after the RFID reading unit generates the network server access data,
    wherein the data link between the RFID data storage medium and the RFID reading unit as well as the setup of the data link to the network server are controlled by means of software that is installed on the mobile radio device.

13. The method as in to claim 12, wherein when starting the software, the RFID reading unit reads out the RFID data record from the RFID data storage medium, generates an access right for the server data memory area from these data, directs a request to the network server and processes the data received from the network server such that the data can be presented on the mobile radio device.

14. The method as in claim 12, wherein the software is a basic reading software with which further reference data, that are stored on the RFID data storage medium, are configured to be read out, in order to be able to directly download extended application software modules onto the mobile radio device from the network.

15. The method as in claim 1, wherein the setup of the data link to the network server is effected via the radio interface that is specified in accordance with a standard such as a mobile radio standard or local radio network standard.

16. The method as in claim 1, wherein the server data memory area includes data and connection to other databases or websites.

17. The method as in claim 1, wherein the RFID data storage medium further stores reference data for the server data memory area, which reference data are configured to be read out manually in an off-line mode and are configured to either be used directly or serve for the manual setup of a network link.

18. The method as in claim 1, wherein data transmission, over a data link between the mobile radio device and the network server for transmitting or receiving first data, is effected in an encrypted manner.

19. The method as in claim 18, wherein a key for an encryption algorithm is stored on the RFID data storage medium.

20. The method as in claim 1, wherein by means of an additional signal input for determining an external condition, the RFID data record for accessing the network server is configured to be stored in a pre-set memory area in a targeted manner, corresponding to the state of the signal input.

21. A system comprising:
   a mobile device comprising an RFID reading unit;
   a network server comprising a server data memory area, said server data memory area comprising first data;
   an RFID element comprising an RFID data storage medium, said RFID data storage medium comprising an RFID data record, said RFID data record comprising second data, wherein the second data comprises information to form a data link to the network server;
   wherein the mobile device is configured to
   receiving said RFID data record from said RFID element to said RFID reading unit, said RFID reading unit generating network server access data based on the information to form the data link to the network server on said RFID data record;
   receiving said first data from said server data memory area.

22. A system as in claim 21 further comprising:
   the server data memory area being provided with an access authorization for different user categories with specific access rights, wherein:
      members of a first user category possess the full access authorization including write and read authorization and directly have access to the server data memory area by means of an authentication, and
      members of a second user category possess read authorization and indirect access to the server data memory area.

23. The system as in claim 21, wherein the mobile radio device has a near field communication (NFC) interface which is compatible with an RFID interface.

24. The system according to claim 21, wherein the RFID data storage medium has another memory area for receiving further access data and reference data.

25. The system according to claim 21, wherein the RFID data storage medium has an additional signal input for determining an external condition with which the RFID data record, for addressing the server data memory area, is configured to be stored in a pre-set memory area in a targeted manner, corresponding to the state of the signal input.

\* \* \* \* \*